Aug. 8, 1939.  R. A. GOEPFRICH  2,168,646
BRAKE
Filed Oct. 8, 1937  3 Sheets-Sheet 1

INVENTOR
RUDOLPH A. GOEPFRICH
BY M.W. McConkey
ATTORNEY

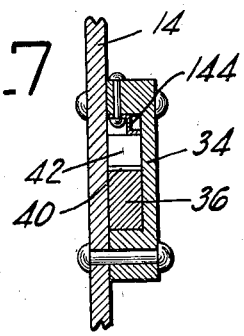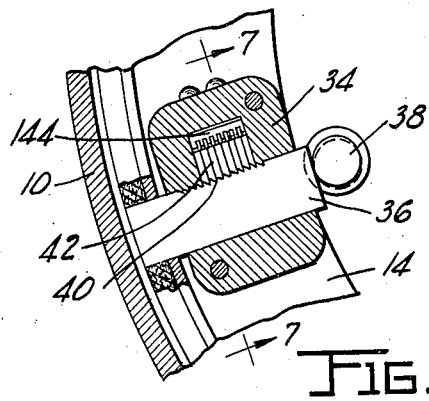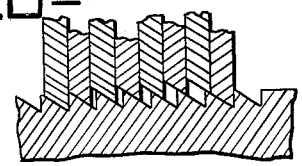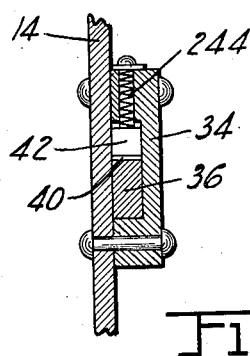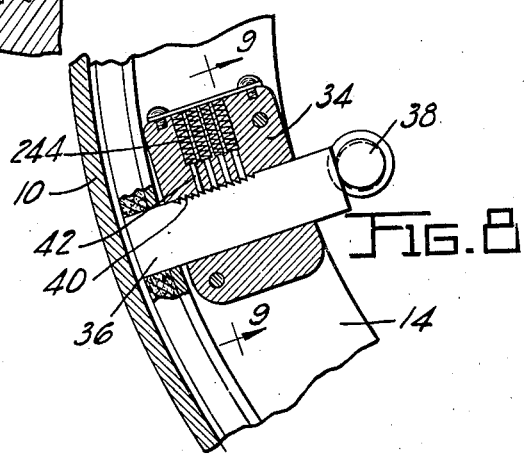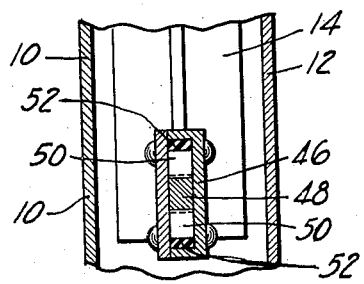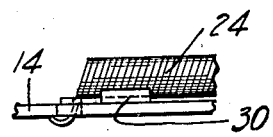

Aug. 8, 1939.   R. A. GOEPFRICH   2,168,646
BRAKE
Filed Oct. 8, 1937   3 Sheets-Sheet 3

INVENTOR
RUDOLPH A. GOEPFRICH
BY
ATTORNEY

Patented Aug. 8, 1939

2,168,646

UNITED STATES PATENT OFFICE 2,168,646

BRAKE

Rudolph A. Goepfrich, South Bend, Ind., assignor to Bendix Products Corporation, South Bend, Ind., a corporation of Indiana Application October 8, 1937, Serial No. 167,924

3 Claims. (Cl. 188—79.5)

This invention relates to brakes, and is illustrated as embodied in a brake of the type having shoes one of which anchors in forward braking and the other of which anchors in reverse braking, thereby securing a servo action of one shoe on the other in both forward and reverse braking.

An object of the invention is to provide a brake of this type with automatic adjusting means to compensate for wear, which will not over-adjust when the drum expands due to the heat of prolonged braking. In one desirable arrangement the shoes are provided with automatic stops adjusted automatically, when wear has taken place, by engagement with the brake drum when the brake is applied, and an extensible connection between the shoes which is lengthened automatically by the return springs of the brake when the shoes are returned to idle positions determined by these stops upon release of the brake. Since the adjustment is dependent on direct engagement with the drum, expansion of the drum does not affect the adjustment.

Various features of novelty relate to the mounting and arrangement of the stops and the extensible connection, and to novel pawl-and-ratchet devices permitting them to move only in the direction to compensate for wear.

The above and other objects and features of the invention, including novel constructions and desirable particular arrangements, will be apparent from the following description of the illustrative embodiments shown in the accompanying drawings, in which:

Figure 4 is a partial section on the line 4—4 of Figure 1;

Figure 5 is a detail view looking in the direction of the arrows 5—5 of Figure 1, and showing the attachment of one of the return springs to one of the shoes;

Figure 6 is a view corresponding to part of Figure 1, but showing a different form of stop device for one of the shoes;

Figure 6a is a detail sectional view on a much enlarged scale, showing the pawl arrangement;

Figure 7 is a partial section on the line 7—7 of Figure 6;

Figure 8 is a view corresponding to Figure 6, but showing a third form of stop device;

Figure 9 is a partial section on the line 9—9 of Figure 8;

Figure 1:
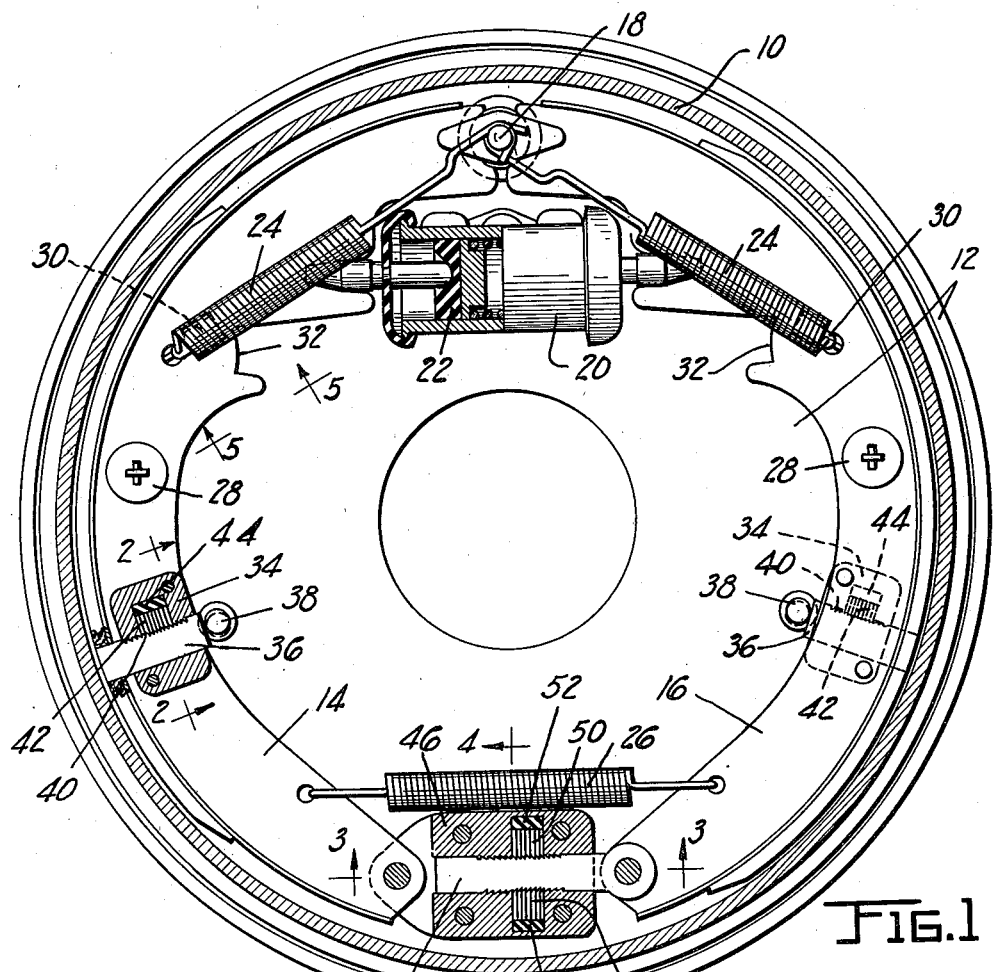
Figure 1 is a vertical section through the brake, just inside the head of the brake drum, showing the shoes in side elevation.
Figures 2, 3:
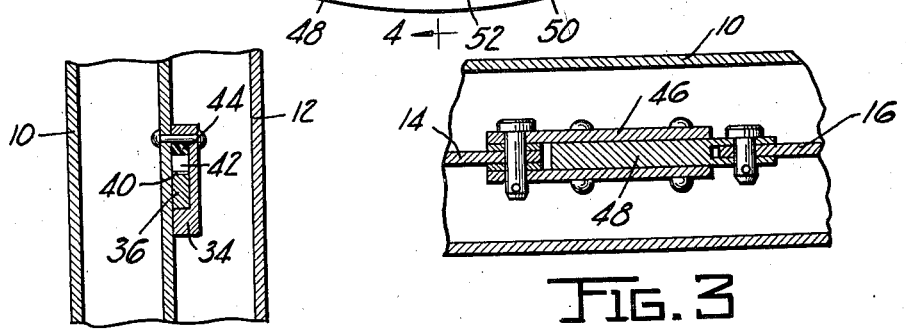
Figure 2 is a partial section on the line 2—2 of Figure 1.
Figure 3 is a partial section on the line 3—3 of Figure 1.

Each of the brakes illustrated includes a rotatable brake drum 10, a backing plate 12 at the open side of the drum, a pair of arcuate shoes 14 and 16 faced with brake lining, anchorage means at one side of the brake and which may be an anchor post 18 carried by the backing plate between the ends of the shoes, applying means such as a hydraulic cylinder 20 having pistons 22 acting on the shoes, return springs 24 tensioned between the shoes and the anchor 18, a spring 26 weaker than spring 24 and tensioned between the shoes at the opposite side of the brake from the anchor, and suitable steady rests 28. The spring 24 acting on the shoe which anchors in forward braking is stronger than the other spring 24.

The return springs may be provided with suitable stamped clips 30 (Figure 5). The shoes may be notched at 32 to engage an auxiliary mechanical applying device (not shown) for use as an emergency or parking brake.

In the brake of Figures 1-5, each of the shoes 14 and 16 is provided on one side of the web, with a stop device including a guide 34 riveted thereto and embracing a radial plunger 36. The plungers 36 are rounded slightly at their outer ends, and pass through openings in the brake lining. They engage the rotating drum when the brake is applied, and are pushed by the drum radially inward until they are flush with the brake lining. When the brake is released, the springs 24 pull the shoes 14 and 16 back to idle positions determined by engagement of the notched upper ends of the shoes with the anchor 18, and by engagement of the plunger 36 with fixed stop pins 38 carried by the backing plate.

One side of each plunger 36 is provided with a ratchet 40 engaged by a series of pawls 42 mounted in a recess in the guide 34 and individually yieldingly pressed against the ratchet 40 by a block 44 of yieldable resilient material such as rubber. The teeth of the ratchet 40 face in such a direction as to permit the plunger 36 to be pushed radially inward, while resisting any outward movement of the plunger. By providing a series of pawls 42 spaced differently from the teeth of the ratchet, a very fine adjustment can be obtained, with some one or another of the pawls holding the ratchet.

Opposite the anchor 18, the shoes are provided with an extensible connection, illustrated as including a guide sleeve 46 pivoted to the shoe 14 and embracing a plunger 48 pivoted to the shoe 16. Both edges of plunger 48 are shown provided with ratchet teeth engaged by series of pawls 50 individually yieldingly pressed against the ratchet teeth by means such as blocks 52 of rubber.

The pawls 50 and the blocks 52 are mounted in recesses in the guide sleeve 46. The pawls 50 are spaced differently from the ratchet teeth, to secure a fine adjustment. Since a considerable thrust load comes on these pawls when the brake is applied, preferably they are spaced so that a pair of them (or more) will seat at once.

In operation, the brake is applied by pressure in the cylinder 20, either shoe 14 or shoe 16 anchoring on the post 18, according to which direction the drum is turning. When the brake is so applied, the plungers 36 engage the drum and, if wear of the lining has taken place, they are pushed by the drum radially inward until they are flush with the surface of the worn brake lining.

When the brake is released, the shoes are pulled by springs 24 back against the anchor 18 and stop pins 38. If the plungers 36 have been shifted on the previous application of the brake, this will cause pivoting of the shoes about the stop pins 38, to spread the lower ends of the shoes apart (against the resistance of the weak spring 26). This pulls the plunger 48 out of the guide 46 to lengthen the extensible connection by an amount corresponding to the adjustment of the stops 36.

Figure 10:
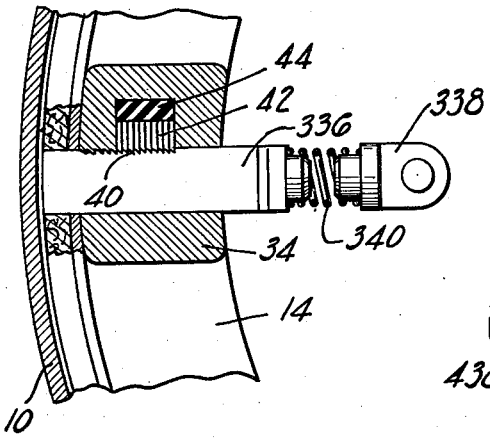
Figure 10 is a view corresponding to Figure 6, but showing a fourth form of stop device.

In Figures 6 and 7, the pawls 42 are individually pressed against the ratchet 40 by spring fingers formed on a leaf spring device 144 in the guide 34. In Figures 8 and 9 there are coil springs 244 pressing the pawls 42 against the ratchet. In Figure 10 the stop plunger 336 engages a pivoted fixed stop 338, a light spring 340 between them collapsing when the brake is released.

Figure 11:
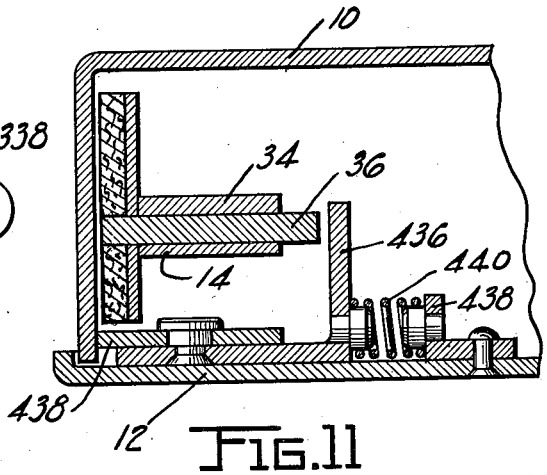
Figure 11 is a partial radial section through a brake having a fifth form of stop device.
Figure 12:
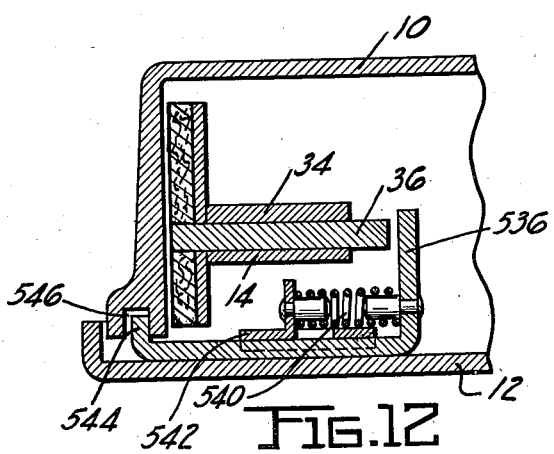
Figure 12 is a view corresponding to Figure 11, but showing a sixth form of stop device.

Figure 11 shows an arrangement where, in place of the stop pin 38, there is substituted an angular movable stop 436 directly engaged by the plunger 36 when the brake is released. The stop 436 is positioned by a roller 438 directly engaging and held against the drum 10 under the influence of a spring 440 reacting against a bracket 442 riveted to the backing plate. In Figure 12, a stop 536 which positions the shoe is urged in the opposite direction from stop 436 by a spring 540 reacting against a bracket 542 carried by the backing plate. The stop 536 has a lug 544 running in a groove 546 in the edge of the brake drum.

Figure 13:
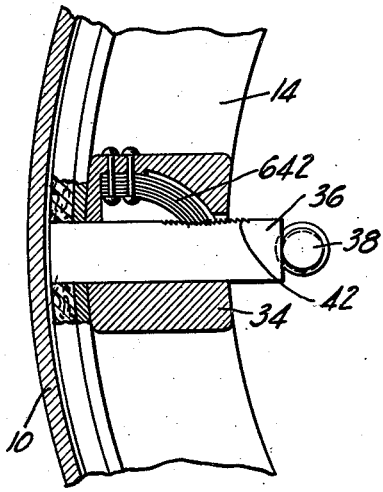
Figure 13 is a view corresponding to Figure 6, but showing a seventh form of stop device.

Figure 13 differs from Figures 1, 6 and 8, in that there is a series of spring pawls 642 arranged in a recess in the guide 34 and engaging the ratchet 40.

While several embodiments have been described in detail, it is not my intention to limit the scope of the invention to those particular embodiments, or otherwise than by the terms of the appended claims.

I claim:

1. A brake shoe having a stop including a plunger mounted on the shoe for movement crosswise of the shoe and one end of which is engageable with a drum against which the shoe is forced and which plunger is provided with a ratchet along one side, a series of pawls carried by the shoe and engaging the ratchet, and a block of yielding material individually pressing the pawls against the ratchet.

2. A brake shoe having a stop including a member movably mounted on the shoe and which has a part engageable with a drum against which the shoe is forced to shift said member away from the drum and which member is provided with a ratchet, a series of pawls carried by the shoe and engaging the ratchet, and a block of yielding material individually pressing the pawls against the ratchet.

3. A brake comprising a drum, a pair of shoes within the drum having anchorage and applying means and provided with return springs, a stop adjacent each shoe, a plunger movably carried by each shoe and engageable at one end with the drum when the brake is applied and at the other end with the corresponding stop when the brake is released, a plurality of yieldingly operated pawls carried by each shoe and engageable with ratchet teeth on the corresponding plunger to hold the plunger in any position to which it is shifted by the drum, the pawls and teeth being differently spaced thereby giving a fine adjustment, and an extensible connection between the shoes including members, one having ratchet teeth and the other having a plurality of yieldingly operated pawls spaced differently from said teeth to give a fine adjustment of said connection.

RUDOLPH A. GOEPFRICH.